US009002391B1

(12) United States Patent
Goyal et al.

(10) Patent No.: US 9,002,391 B1
(45) Date of Patent: Apr. 7, 2015

(54) METHOD AND SYSTEM WITH ADJUSTED POWER HEADROOM REPORTS FOR UPLINK RESOURCE ALLOCATION

(75) Inventors: Anoop K. Goyal, Overland Park, KS (US); Maulik K. Shah, Overland Park, KS (US); Jasinder P. Singh, Olathe, KS (US); Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 426 days.

(21) Appl. No.: 13/528,305

(22) Filed: Jun. 20, 2012

(51) Int. Cl.
*H04B 7/00* (2006.01)
*H04W 52/36* (2009.01)
*H04W 52/14* (2009.01)

(52) U.S. Cl.
CPC .......... *H04W 52/365* (2013.01); *H04W 52/146* (2013.01)

(58) Field of Classification Search
CPC ............ H04W 52/365; H04W 52/146; H04W 52/367; H04W 52/10
USPC .......... 455/509, 522, 69, 68, 127.1, 512, 511, 455/445, 500, 517, 550.1, 67.11, 426.1, 455/426.2, 513, 423–425, 450, 451, 452.1, 455/453.1; 370/310, 328, 329, 338.343
See application file for complete search history.

(56) References Cited

U.S. PATENT DOCUMENTS

| | | | |
|---|---|---|---|
| 2009/0245191 A1 | 10/2009 | Ball et al. | |
| 2011/0085483 A1 | 4/2011 | Yeon et al. | |
| 2011/0171988 A1 | 7/2011 | Kim et al. | |
| 2011/0216721 A1 | 9/2011 | Min | |
| 2011/0263284 A1 | 10/2011 | Ogawa et al. | |
| 2012/0044882 A1 | 2/2012 | Kim et al. | |
| 2012/0302173 A1* | 11/2012 | Bostrom et al. | ........... 455/67.11 |
| 2014/0254527 A1* | 9/2014 | Kim et al. | ..................... 370/329 |

* cited by examiner

*Primary Examiner* — Keith Ferguson (57) ABSTRACT

A wireless network allocates uplink resources to wireless communication devices (WCDs) based on power headroom reports, with more resources being allocated to WCDs reporting greater power headrooms. Each WCD may determine a respective power headroom as a difference between its maximum transmit power and a transmit power requirement for its current uplink resource allocation. However, a WCD may report an adjusted power headroom that is obtained, for example, by decreasing its respective power headroom by an adjustment value. The WCD may then receive an uplink resource allocation that is based on the adjusted power headroom that it reported. The adjustment value could be based on a priority level of the WCD, a priority level of data to be transmitted by the WCD, and/or an instruction from the wireless network. In one example, basic-priority WCDs report adjusted power headrooms so that more uplink resources are available for high-priority WCDs.

20 Claims, 6 Drawing Sheets

METHOD AND SYSTEM WITH ADJUSTED POWER HEADROOM REPORTS FOR UPLINK RESOURCE ALLOCATION

BACKGROUND

In certain wireless communication systems, a wireless communication device (WCD) can transmit data at varying data rates. For example, an WCD's uplink data rate could depend on the frequency bandwidth, modulation, and coding schemes used in the uplink transmissions. These factors can also affect the power needed for the uplink transmissions. In the case that orthogonal frequency division multiple access (OFDMA) is used for the uplink, for example, in Long Term Evolution (LTE) air interfaces, the transmitted power for a given modulation and coding scheme can be a function of the frequency bandwidth that is used. Thus, if the modulation and coding scheme remains fixed, a WCD can transmit at a higher uplink data rate by using a greater frequency bandwidth and more transmit power.

In the LTE approach, the network typically allocates uplink resources to a WCD in the form of one or more resource blocks. Each resource block has a duration of 0.5 milliseconds (a period of time that may be referred to as a slot) and has a total of 12 sub-carriers, with each sub-carrier occupying 15 kHz of frequency bandwidth. A WCD could be allocated more than one resource block for a given slot, and the WCD's transmit power requirement could scale with the number of resource blocks. For example, the transmit power requirement for a given WCD transmitting into an uplink channel, may be calculated as follows:

$$P = P_0 + \alpha L + \Delta + 10 \log_{10} M \tag{1}$$

where P is the transmit power requirement (in dB), $P_0$ is a base level, $\alpha$ is a path-loss compensation factor, L is a path-loss estimate, $\Delta$ is a dynamic offset, and M is the number of resource blocks allocated to the WCD.

While a WCD's transmit power requirement may increase with the number of resource blocks allocated to it, the WCD may also be associated with a maximum transmit power. The maximum transmit power could, for example, be based on limitations of the WCD's hardware, software, or firmware and/or based on a limitation set by the network. In the LTE approach, a WCD may calculate a "power headroom" as a difference between the WCD's transmit power requirement for its resource block allocation and the WCD's maximum transmit power, and the WCD may report the power headroom that it calculates to the network. The power headroom that a WCD calculates could be positive, for example, when the WCD's transmit power requirement is less than its maximum transmit power. However, the power headroom could also be negative, for example, when the WCD has been given a resource block allocation with a transmit power requirement that exceeds its maximum transmit power.

The network may use the power headrooms reported by the WCDs operating in a wireless coverage area to adjust the uplink resources that are allocated to those WCDs. For example, a WCD that reports a positive power headroom could be allocated a greater number of resource blocks, whereas a WCD that reports a negative power headroom could be allocated a fewer number of resource blocks.

OVERVIEW

In a first principal aspect, an exemplary embodiment provides a method for a wireless communication device (WCD). The WCD uses a first uplink resource allocation to transmit first data to a wireless network. The WCD determines a transmit power requirement for the first uplink resource allocation. The WCD determines a power headroom based on a difference between a maximum transmit power and the transmit power requirement. The WCD determines an adjustment value. The WCD adjusts the power headroom based on the adjustment value to obtain an adjusted power headroom. The WCD transmits a report of the adjusted power headroom to the wireless network. The WCD receives from the wireless network a second uplink resource allocation in response to the report of the adjusted power headroom. The WCD uses the second uplink resource allocation to transmit second data to the wireless network.

In a second principal aspect, an exemplary embodiment provides a WCD comprising a transmitter for wirelessly transmitting data to a wireless network, a receiver for wirelessly receiving data from the wireless network, a processor, data storage, and instructions stored in the data storage and executable by the processor to cause the WCD to perform functions. The functions comprise: (a) determining a transmit power requirement for a first uplink resource allocation available to transmit first data to the wireless network; (b) determining a power headroom based on a difference between a maximum transmit power and the transmit power requirement; (c) determining an adjustment value; (d) adjusting the power headroom based on the adjustment value to obtain an adjusted power headroom; (e) transmitting, via the transmitter, a report of the adjusted power headroom to the wireless network; (f) receiving, via the receiver, a second uplink resource allocation from the wireless network in response to the report of the adjusted power headroom; and (g) using the second uplink resource allocation to transmit, via the transmitter, second data to the wireless network.

In a third principal aspect, an exemplary embodiment provides a method for a wireless network. The wireless network serves a plurality of wireless communication devices (WCDs) in a wireless coverage area, the plurality of WCDs including one or more basic-priority WCDs and one or more high-priority WCDs. The wireless network detects a trigger condition for the wireless coverage area. In response to the trigger condition, the wireless network instructs the basic-priority WCDs to report adjusted power headrooms.

DETAILED DESCRIPTION OF EXEMPLARY EMBODIMENTS

1. Introduction

The inventors have recognized that conventional approaches for allocating uplink resources based on power headroom reports can lead to inefficiencies. For example, the wireless network may have a limited number of resource blocks that it can allocate for uplink communications in a given wireless coverage area. If all of the resource blocks in that area are allocated, then the wireless network might be unable to allocate additional uplink resources to a WCD that reports a positive power headroom, unless (1) the power headroom reported by the WCD is greater than the power headrooms reported by the other WCDs in the area, or (2) one or more of the allocated resource blocks are de-allocated (e.g., because a WCD reports a negative power headroom or ceases uplink communications).

To address such inefficiencies, the inventors propose that a WCD could report an adjusted power headroom. A WCD could determine an adjusted power headroom by determining a power headroom (e.g., as a difference between a transmit power requirement and a maximum transmit power) and adjusting the power headroom based on an adjustment value to obtain an adjusted power headroom. The WCD could then report the adjusted power headroom and receive an uplink resource allocation (e.g., an allocation of a number of resource blocks) based on the adjusted power headroom. In this way, a WCD may use a positive adjustment value to obtain an upwardly-adjusted power headroom and, thereby, potentially receive a larger uplink resource allocation (e.g., a greater number of resource blocks). As well, a WCD may use a negative adjustment value to obtain a downwardly-adjusted power headroom and, thereby, potentially receive a smaller uplink resource allocation (e.g., a fewer number of resource blocks).

Whether a WCD uses a positive or negative adjustment value can depend on various factors. In some examples, a WCD may apply an adjustment value that is based on a priority level of the WCD. The priority level of the WCD could be based, for example, on the type of WCD and/or on the level of service to which the user of the WCD has subscribed. High-priority WCDs could then apply positive adjustment values, so as to increase their uplink resource allocations and/or basic-priority WCDs could apply negative adjustment values in order to make more uplink resources available to high-priority WCDs.

In other examples, a WCD may apply an adjustment value that is based on a priority level of the data to be transmitted by the WCD. Thus, a WCD may apply a positive adjustment value for high-priority data and/or a negative adjustment value for low-priority data. High-priority data could include, for example, data related to an application invoked by a user of the WCD or data related to certain types of user-invoked applications, such real-time applications. Low-priority data could include, for example, data related to non-real-time applications or data related to background tasks that are not invoked by the user of the WCD.

In still other examples, a WCD could apply an adjustment value that is based on an instruction from the wireless network. The instruction from the wireless network could instruct a particular WCD or a particular class of WCDs to begin reporting adjusted power headrooms. The instruction could include a specific adjustment value for determining adjusted power headrooms. Alternatively, the instruction might not include a specific adjustment value but could instead instruct an WCD to apply an adjustment value with which the WCD has already been provisioned. Other instructions regarding adjustment values are also possible.

It is to be understood that the foregoing examples of how adjustment values can be determined is not exhaustive, as adjustment values could be determined in other ways, based on other criteria. In addition, some of the approaches described above could be combined. For example, a WCD might be provisioned with multiple adjustment values that are based on a priority level of the WCD, with different adjustment values being applicable to different priority levels of data that the WCD could transmit. Further, a WCD might be provisioned with one or more adjustment values (which could correspond to a priority level of the WCD and/or to one or more priority levels of data that the WCD could transmit) but not apply any of the one or more adjustment values until it receives an instruction from the wireless network. The wireless network might transmit the instruction only when a predefined trigger condition occurs. The predefined trigger condition might occur when uplink resource usage in the wireless coverage area serving the WCD reaches a predetermined threshold level or when the number of WCDs (or the number of high-priority WCDs) being served by the wireless coverage area reaches a predetermined threshold number. Such trigger conditions may correspond to circumstances in which it may be beneficial to use adjusted power headrooms to free up uplink resources that can then be allocated to high-priority WCDs or to WCDs that are transmitting high-priority data.

In this way, adjusted power headrooms may be used to allocate uplink resources in a wireless coverage area more efficiently.

2. Exemplary Communication System

Figure 1:
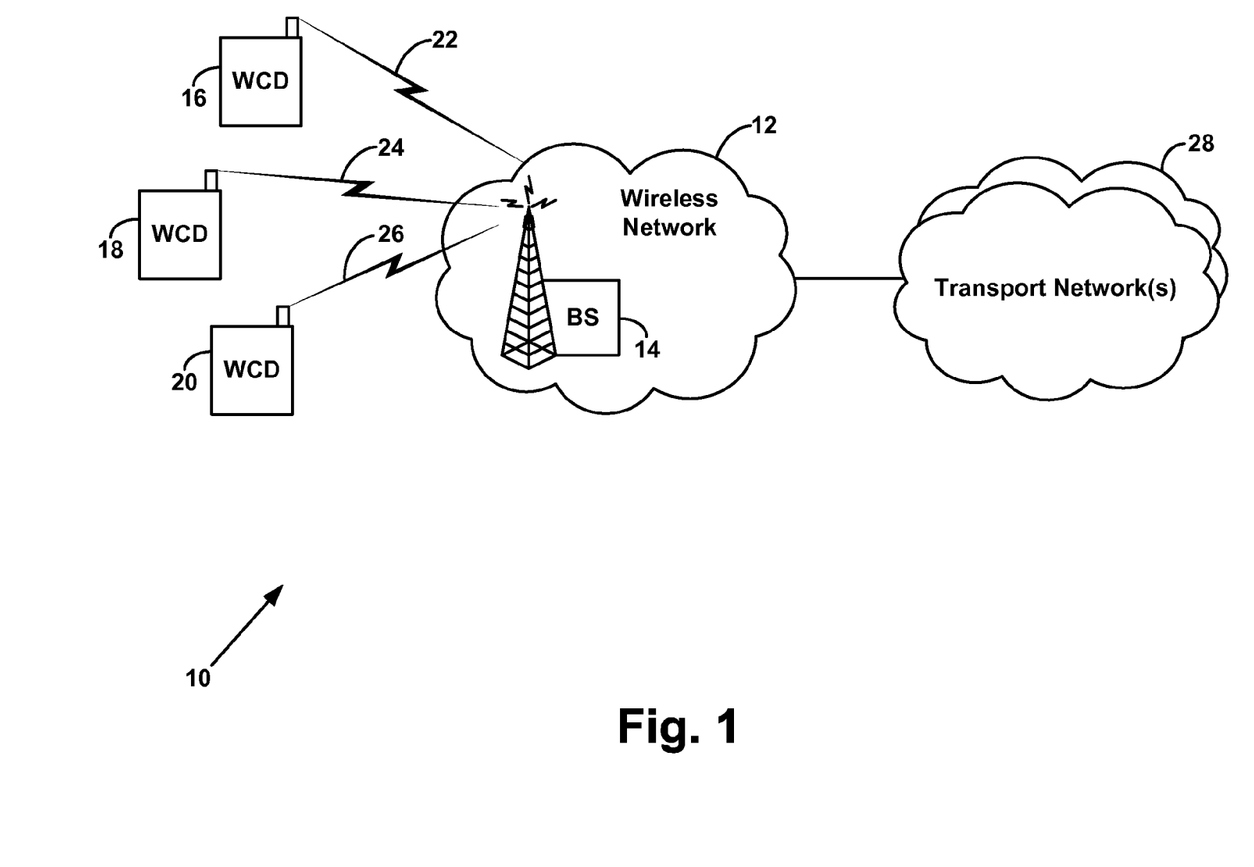
FIG. 1 is a block diagram of a communication system, in accordance with an exemplary embodiment.

FIG. 1 is a block diagram of a communication system 10 in which exemplary embodiments may be employed. Communication system 10 includes a wireless network 12 that includes one or more entities that can communicate over an air interface, as exemplified by base station (BS) 14. Wireless network 12 could also include one or more control entities, such as a base station controller (BSC) or radio network controller (RNC). Wireless network 12 could be, for example, a radio access network (RAN). BS 14 could be, for example, a base transceiver station, a wireless access point, an access node, a Node-B, or an eNodeB. Although FIG. 1 shows only one base station in wireless network 12, it is to be understood that wireless network 12 could include any number of base stations.

BS 14 radiates to define one or more wireless coverage areas within which BS 14 can wirelessly communicate with WCDs. The wireless coverage area defined by BS 14 could be a cell that generally surrounds BS 14. Alternatively, BS 14 may define multiple wireless coverage areas, such as sectors. Each sector may be defined by multiple antennas in BS 14 so as to generally correspond to a range of azimuthal angles (e.g., 120°) about BS 14.

For purposes of illustration, BS 14 is shown as being in wireless communication with WCDs 16, 18, and 20 via respective air interfaces 22, 24, and 26. WCDs 16, 18, and 20 could be wireless telephones, wireless handheld or laptop computers, or other types of wireless communication devices. Although FIG. 1 shows BS 14 in wireless communication with three WCDs, it is to be understood that BS 14 could be in wireless communication with a greater or fewer number of WCDs. In addition, the number of WCDs in wireless communication with BS 14 can change over time, for example, as a result of one or more WCDs moving into or out of the wireless coverage area of BS 14 and/or as a result of one or more WCDs beginning or ending communication sessions.

Each of air interfaces 22, 24, and 26 could include a respective uplink, with which a WCD can transmit data to BS 14, and a respective downlink, with which BS 14 can transmit data to a WCD. The communications over air interfaces 22, 24, and 26 could conform to any wireless protocol now known or later developed. For purposes of illustration, the communications over air interfaces 22, 24, and 26 will be described herein with respect to the LTE protocol.

Wireless network 12 may provide connectivity with one or more transport networks 20, which could include, for example, the public switched telephone network (PSTN) and/or the Internet or other packet-switched networks. With this arrangement, a WCD being served by BS 14 may engage in a communication session, via wireless network 12, with an endpoint connected to one of transport networks 20. The endpoint could be, for example, another WCD, a landline telephone, an email server, Web server, media server, or gaming server. The communication session could involve voice, text, images, video, data, or other media that is transferred from the WCD to the endpoint and/or from the endpoint to the WCD.

Thus, when a WCD, such as WCD 16, 18, or 20, is involved in a communication session, the WCD may transmit data over an uplink channel to BS 14 and may receive data from BS 14 over a downlink channel. In some cases, the communication session could be one that involves a user of the WCD, such as a voice communication application or Web browsing application. In other cases, the communication session could involve a background task, such as periodically registering with wireless network 12. In some implementations, WCDs 16, 18, and 20 may transmit data to BS 14 over a shared uplink channel. The usage of the shared uplink channel may be controlled by BS 14 or by some other entity in wireless network 12.

Figure 2A:
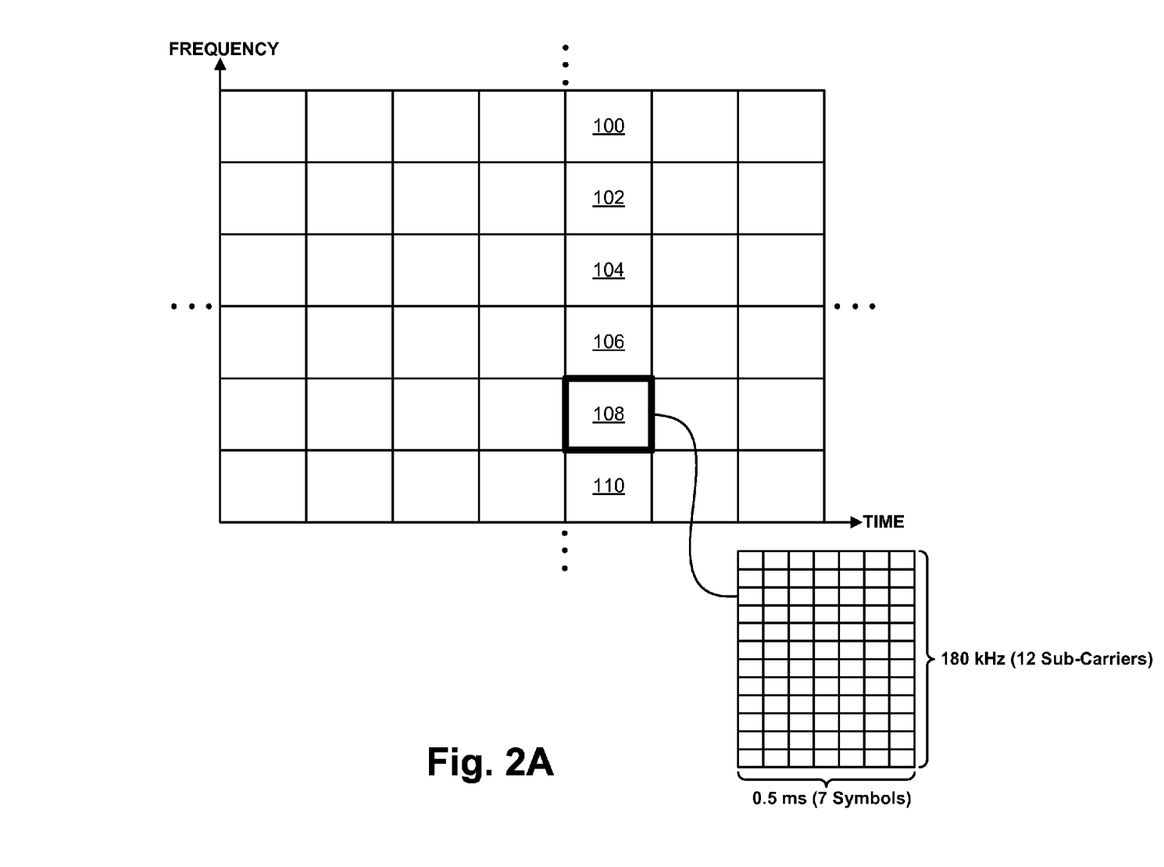
FIG. 2A is a conceptual illustration of a division of a shared uplink channel into resource blocks, in accordance with an exemplary embodiment.

For example, the LTE protocol defines a Physical Uplink Shared Channel (PUSCH) that WCDs can use to transmit data to a base station. Portions of the PUSCH may be allocated to particular WCDs in the form of resource blocks. FIG. 2A illustrates how the PUSCH (or other shared uplink channel) in a given wireless coverage area may be divided in time and frequency domains into resource blocks. In the time domain, each resource block occupies a 0.5 millisecond slot of time. By way of example, FIG. 2A shows resource blocks 100-110 for a particular slot. In the frequency domain, each of resource blocks 100-110 occupies a respective portion of frequency bandwidth, typically 180 kHz in LTE implementations. Although FIG. 2A shows six resource blocks in each slot, a wireless coverage area could have a greater number of resource blocks, as indicated by the dots above and below resource blocks 100-110.

FIG. 2A also includes a more detailed view of resource block 108. This detailed view shows that the 180 kHz of frequency bandwidth corresponds to 12 sub-carriers of 15 kHz each, and also shows that the 0.5 millisecond slot of time corresponds to the duration of seven symbols on each sub-carrier. Thus, a resource block may be described as a set of resource elements, with each resource element corresponding to one sub-carrier for the duration of one symbol. Nonetheless, a resource block may be allocated in its entirety to a particular WCD. For example, resource blocks 100 and 102 might be allocated to WCD 16, resource blocks 104-108 might be allocated to WCD 18, and resource block 110 might be allocated to WCD 20.

The allocation of resource blocks to WCDs could be made by BS 14 or by some other entity in wireless network 12. Further, resource blocks could be allocated to WCDs based on the power headrooms reported by the WCDs. BS 14 may periodically evaluate, and potentially adjust, the allocation of resource blocks to WCDs. This evaluation may occur every subframe, wherein a subframe consists of two consecutive slots. Thus, when a WCD is allocated one or more resource blocks, that allocation may be maintained throughout a subframe (two consecutive slots). In subsequent subframes, the WCD may be allocated a different number of resource blocks.

Figure 2B:
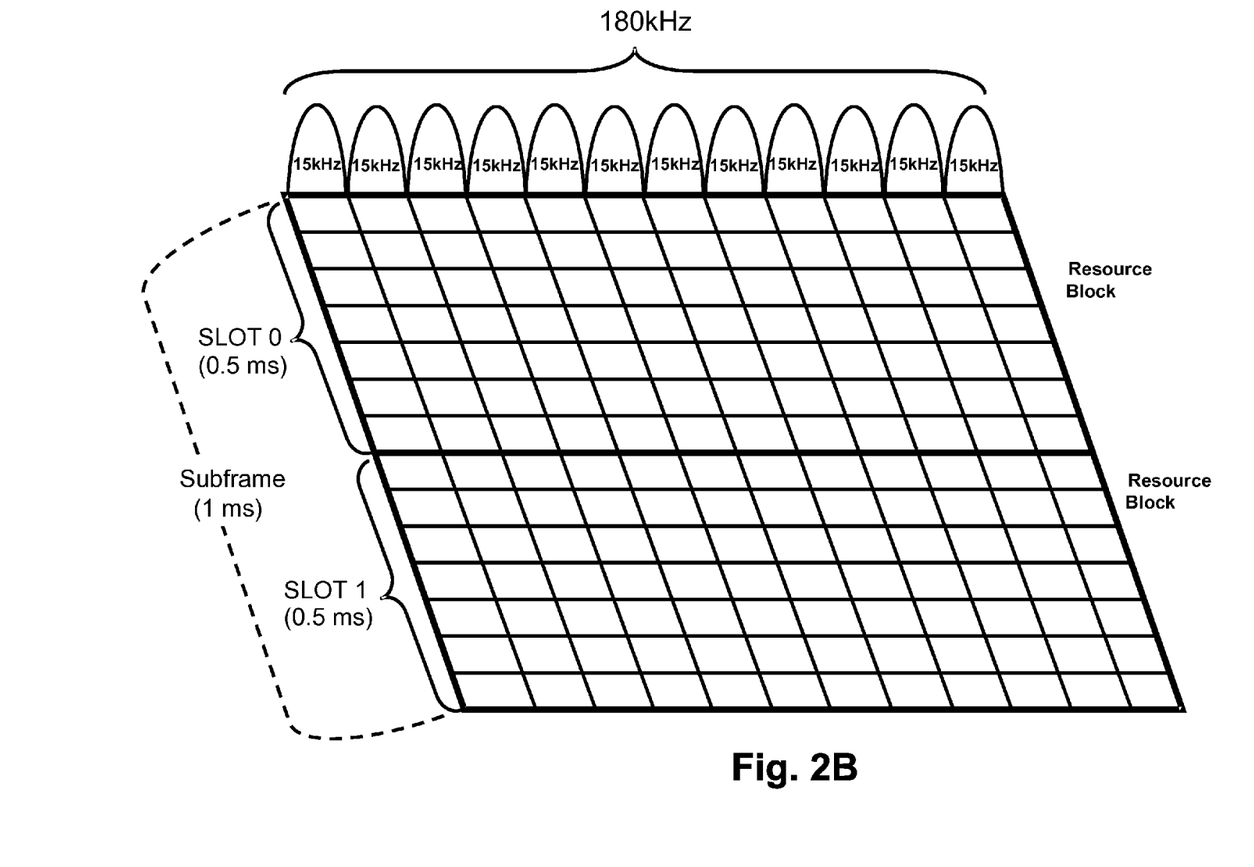
FIG. 2B is a conceptual illustration of two time-consecutive resource blocks, in accordance with an exemplary embodiment.

FIG. 2B illustrates an uplink resource allocation for a WCD that is maintained for two consecutive slots of time (Slot 0 and Slot 1) in a given subframe. Although FIG. 2B shows only one resource block per slot, it is to be understood that the WCD's uplink resource allocation could include a greater number of resource blocks per slot. During this subframe, the WCD may calculate a transmit power requirement for its resource allocation, for example, using equation (1), calculate a power headroom as a difference between the transmit power requirement and a maximum transmit power, and report the power headroom to the wireless network. Based on the power headroom reported by the WCD, and the power headrooms reported by the other WCDs in the wireless coverage area, the wireless network may either increase or decrease the WCD's uplink resource allocation for a subsequent subframe, such as the immediately following subframe.

As described in more detail below, a WCD may use an adjustment value to adjust the power headroom that it calculates for a subframe and report the adjusted power headroom to the wireless network. Based on that adjusted power headroom (as well as the power headrooms reported by the other WCDs in the wireless coverage area), the wireless network may change the WCD's uplink resource allocation for a subsequent subframe. For example, if the adjusted power headroom is positive, the wireless network may increase the WCD's uplink resource allocation (i.e., increase the number of resource blocks allocated to the WCD). If the adjusted power headroom is negative, the wireless network may decrease the WCD's uplink resource allocation (i.e., decrease the number of resource blocks allocated to the WCD).

3. Exemplary Methods

Figure 3:
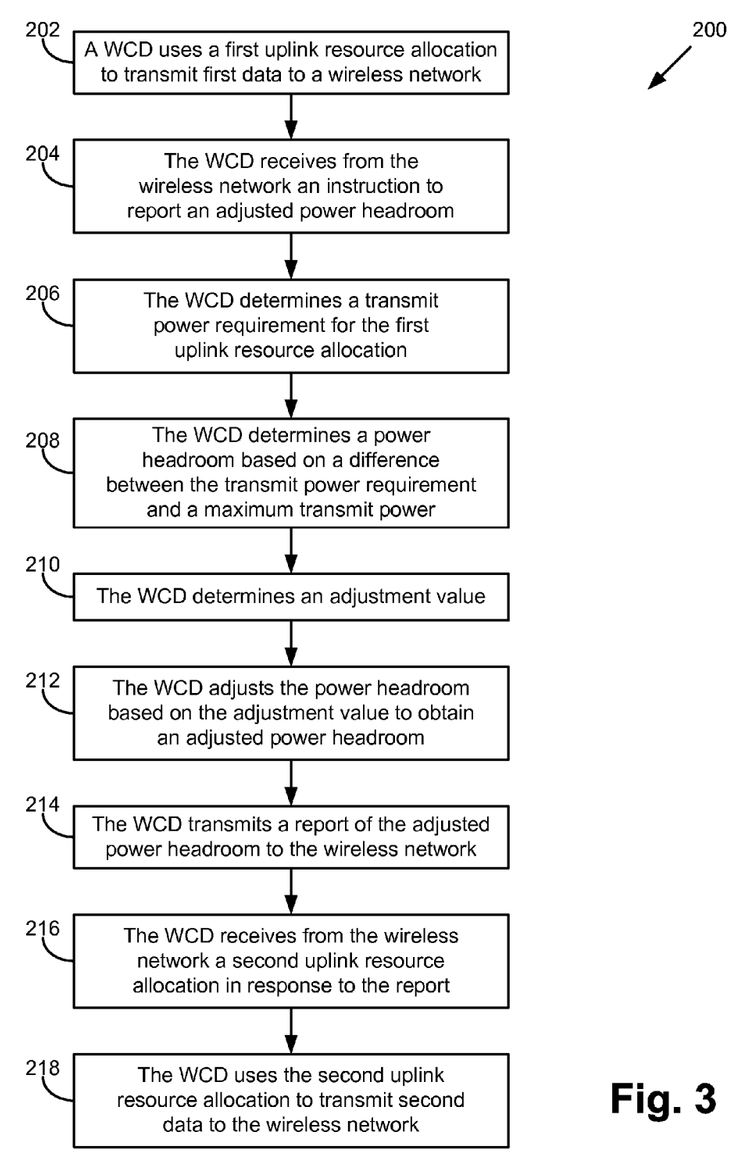
FIG. 3 is a flowchart of a method for a WCD, in accordance with an exemplary embodiment.

FIG. 3 is a flowchart illustrating an exemplary method 200 for a WCD. For purposes of illustration, method 200 is described with reference to the configuration of communication system 10 shown in FIG. 1 and the type uplink resource allocations shown in FIGS. 2A and 2B. It is to be understood, however, that differently configured communication systems and/or other types of uplink resource allocations could be used. Further, although method 200 is illustrated in FIG. 3 and described below as a series of functions performed by a WCD, it is to be understood that the functions could be performed in a different order, that some of the functions could be performed by one or more other entities, that some of the functions could be combined together or omitted, that some of the functions could be replaced by other functions, and that additional functions could be added to the method.

In method 200, a WCD (e.g., WCD 16) uses a first uplink resource allocation to transmit first data to a wireless network (e.g., to BS 14 in wireless network 12), as indicated by block 202. The first data could include, for example, data related to an application invoked by a user of the WCD, data related to a background activity of the WCD that was not invoked by the user, or some other type of data. The first uplink resource allocation could be in the form of one or more resource blocks, such as the resource blocks shown in FIGS. 2A and 2B and described above. The first uplink resource allocation could be allocated to the WCD by the wireless network for a predefined period of time, such as one or more slots or one or more subframes.

At some point, the WCD receives from the wireless network an instruction to report an adjusted power headroom, as indicated by block 204. The WCD could, for example, receive the instruction during the period of time corresponding to the first uplink resource allocation. Alternatively, the WCD could receive the instruction earlier, such as before the wireless network allocated the first uplink resource allocation to the WCD or in connection with the wireless network allocating the first uplink resource allocation to the WCD.

To determine the adjusted power headroom, the WCD may undertake various calculations. Some or all of the calculations could be performed by the WCD in response to receiving the instruction from the wireless network, but some of the calculations could be performed by the WCD before receiving the instructions from the network. In the example shown in FIG. 2, the WCD determines a transmit power requirement for the first uplink resource allocation in response to the instruction from the wireless network, as indicated by block 206. The WCD could, for example, calculate the transmit power requirement in accordance with equation (1) described above.

The WCD may then determine a power headroom based on a difference between the transmit power requirement and a maximum transmit power, as indicated by block 208. For example, the WCD may calculate the power headroom as follows:

$$H = P - P_{MAX} \qquad (2)$$

where H is the power headroom, P is the transmit power requirement (e.g., calculated using equation (1)), and $P_{MAX}$ is the WCD's maximum transmit power.

The WCD also determines an adjustment value, as indicated by block 210. The adjustment value could be included in or specified by the instruction that the WCD received from the wireless network. Alternatively, the WCD could determine the adjustment value based on a priority level associated with the WCD. For example, different WCDs could be provisioned with different adjustment values, with high-priority WCDs being provisioned with a high-priority adjustment value and basic-priority WCDs being provisioned with a different, basic-priority adjustment value. In some cases, only the basic-priority WCDs or only the high-priority WCDs might be provisioned with an adjustment value. Thus, if the adjustment value is based on a priority level of the WCD, the WCD could apply an adjustment value with which the WCD has already been provisioned (e.g., an adjustment value stored in a memory of the WCD) or the WCD could calculate the adjustment value as a function of its priority level.

Instead of or in addition to the WCD's priority level, the adjustment value could be based on a priority level of data being transmitted by the WCD (e.g., the first data) or data in queue to be transmitted by the WCD (e.g., the second data described below). The WCD could determine the priority level of the data based on whether the data is related to an application invoked by a user, whether the data is related to a real-time application, whether the data is related to background activities being performed by the WCD, and/or based on other criteria. Once the priority level of the data has been determined, the WCD may then select an adjustment value based on the priority level. For example, the WCD could be provisioned with a first adjustment value that applies to low-priority data and a second adjustment value that applied to high-priority data. The WCD may then select the adjustment value from among the first and second adjustment values based on whether the data is low-priority data or high-priority data.

In addition to determining the adjustment value based on information contained in the instruction from the wireless network, based on the priority level of the WCD, or based on the priority level of the WCD's data, the adjustment value could also be determined in other ways.

However the adjustment value is determined, the WCD may adjust the power headroom that it calculated based on the adjustment value to obtain an adjusted power headroom, as indicated by block 212. For example, the WCD may calculate the adjusted power headroom as follows:

$$H_A = H + A \qquad (3)$$

where $H_A$ is the adjusted power headroom, H is the power headroom (e.g., calculated using equation (2)), and A is the adjustment value. In some cases, A could be a positive value (such as +1 dB, +5 dB, +10 dB, or +20 dB), in which case the adjusted power headroom is greater than the power headroom. In other cases, A could be a negative value (such as −1 dB, −5 dB, −10 dB, or −20 dB), in which case the adjusted power headroom is less than the power headroom. In still other cases, A could be zero, in which case the adjusted power headroom is equal to the power headroom. For example, the WCD might be provisioned with an adjustment value of zero for high-priority data and an adjustment value of −10 dB for low-priority data. Thus, if the WCD is transmitting high-priority data, the WCD may select an adjustment value of zero.

It is to be understood that equation (3) illustrates only one example of how an adjustment value may be used to adjust a power headroom to obtain an adjusted power headroom. In other examples, an adjustment value could be applied to the power headroom as a multiplicative factor, or some other type of function could be used to calculate the adjusted power headroom based on the power headroom and the adjustment value.

Once the WCD has calculated the adjusted power headroom, the WCD may report the adjusted power headroom to the wireless network, as indicated by block 214. In response to the report, the WCD may receive from the wireless network a second uplink resource allocation, as indicated by block 216. The second uplink resource allocation, like the first uplink resource allocation, could be in the form of one or more resource blocks. However, the first and second uplink resource allocations could include different numbers of resource blocks.

In some cases, the second uplink resource allocation might include a greater number of resource blocks than the first uplink resource allocation. This can occur, for example, when the WCD reports an adjusted power headroom that is positive. Thus, a positive adjustment value can increase the likelihood that a WCD will be allocated more uplink resources. In other cases, the second uplink resource allocation might include a fewer number of resource blocks than the first uplink resource allocation. This can occur, for example, when the WCD reports an adjusted power headroom that is negative. Thus, a negative adjustment value can increase the likelihood that a WCD will be allocated less uplink resources. It is also possible for the first and second uplink resource allocations to include the same number of resource blocks.

Like the first uplink resource allocation, the second uplink resource allocation could be allocated to the WCD by the wireless network for a predefined period of time, such as one or more slots or one or more subframes. The period of time corresponding to the second uplink resource allocation could occur immediately following the period of time corresponding to the first uplink resource allocation. Alternatively, the second uplink resource allocation could correspond to a later period of time, such that there is a time gap (e.g., one or more slots or one or more subframes) between the first and second uplink resource allocations.

The WCD may use the second uplink resource allocation to transmit second data to the wireless network, as indicated by block 218. The second data could relate to the same application, activity, or task as the first data. Alternatively, the second data could relate to a different application, activity, or task.

As method 200 illustrates, having a WCD report an adjusted power headroom can increase the likelihood that a WCD is allocated a greater number or a fewer number of resource blocks in a subsequent subframe. In the example of FIG. 3, the WCD reports the adjusted power headroom in response to receiving an instruction from the wireless network (block 204). In other examples, however, a WCD might report an adjustment power headroom without receiving an instruction to do so from the wireless network. For example, basic-priority WCDs might normally report downwardly-adjusted power headrooms and/or high-priority WCDs might normally report upwardly-adjusted power headrooms.

Figure 4:
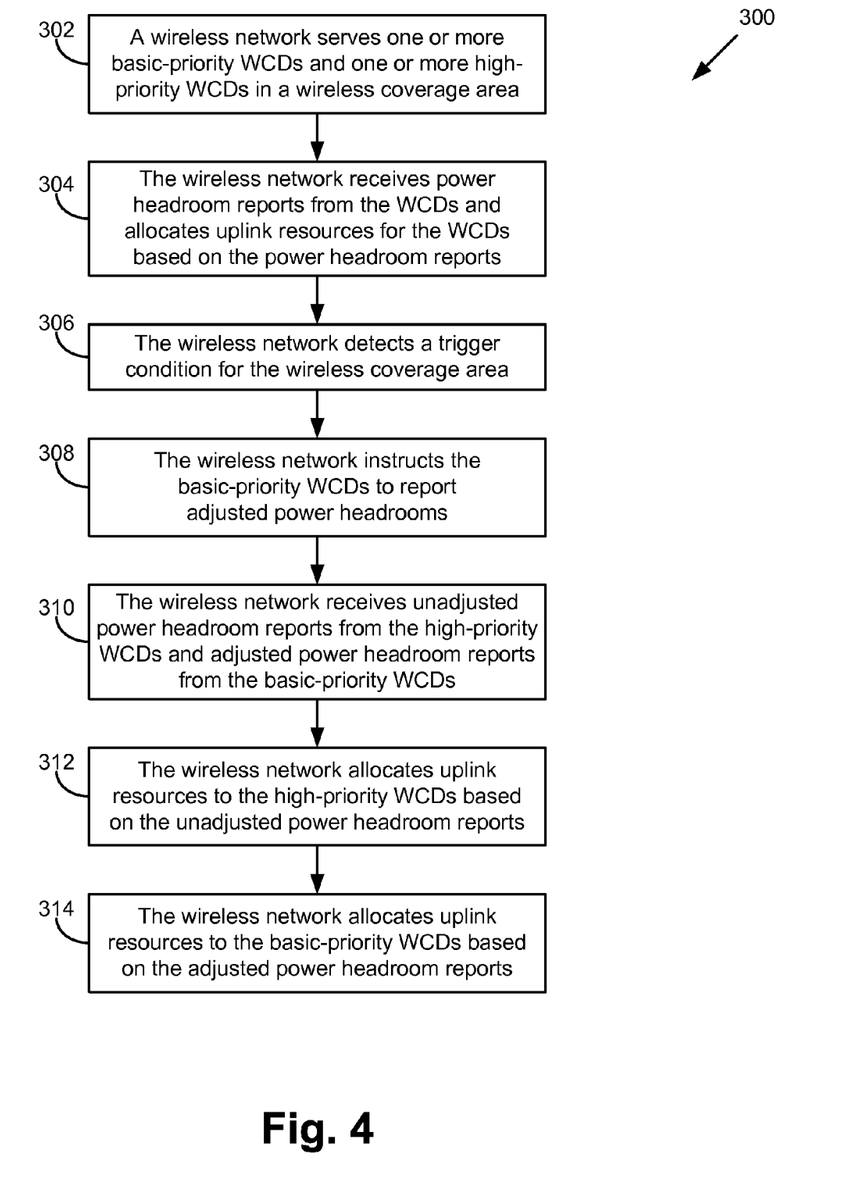
FIG. 4 is a flowchart of a method for a wireless network, in accordance with an exemplary embodiment.

When a wireless network transmits an instruction to report an adjusted power headroom, the instruction could be broadcasted to all of the WCDs in a given wireless coverage area, or the instruction could be transmitted to one or more particular WCDs or transmitted to a particular class of WCDs. FIG. 4 illustrates a method in which a wireless network instructs only basic-priority WCDs to report adjusted power headrooms. For purposes of illustration, method 300 is described with reference to the configuration of communication system 10 shown in FIG. 1 and the type uplink resource allocations shown in FIGS. 2A and 2B. It is to be understood, however, that differently configured communication systems and/or other types of uplink resource allocations could be used. Further, although method 300 is illustrated in FIG. 4 and described below as a series of functions performed by a wireless network, it is to be understood that the functions could be performed in a different order, that some of the functions could be performed by one or more other entities, that some of the functions could be combined together or omitted, that some of the functions could be replaced by other functions, and that additional functions could be added to the method.

In method 300, a wireless network (e.g., wireless network 12) serves one or more basic-priority WCDs and one or more high-priority WCDs in a wireless coverage area, as indicated by block 302. For example, with reference to FIG. 1, the wireless coverage area could be a cell or sector served by BS 14, WCD 16 could be a high-priority WCD, and WCDs 18 and 20 could be basic-priority WCDs. During normal operation, the wireless network receives power headroom reports from the WCDs and allocates uplink resources for the WCDs based on the power headroom reports, as indicated by block 304.

At some point, the wireless network detects a trigger condition for the wireless coverage area, as indicated by block 306. The wireless network could, for example, detect a trigger condition when the wireless network determines that a usage level of the wireless coverage area has reaches a threshold level. The usage level could be characterized in terms of the number of resource blocks that are allocated for uplink transmissions, in terms of the amount of uplink data transmitted during a period of time, or in some other way. Alternatively, the wireless network might detect a trigger condition when the wireless network determines that the number of high-priority WCDs (or the total number of WCDs) being served by the wireless coverage area has reached a threshold number. Other trigger conditions are also possible.

In response to the trigger condition, the wireless network instructs the basic-priority WCDs to report adjusted power headrooms, as indicated by block 308. The instruction from the wireless network could specify an adjustment value for the basic-priority WCDs to use to determine adjusted power headrooms. Alternatively, the instruction from the wireless network might not specify an adjustment value. In that case, the basic-priority WCDs may apply adjustment values with which they have already been provisioned.

In this example, the wireless network instructs the basic-priority WCDs, but not the high-priority WCDs, to report adjusted power headrooms. Thus, the wireless network receives unadjusted power headroom reports from the high-priority WCDs and adjusted power headroom reports from the basic-priority WCDs, as indicated by block 310. The wireless network then allocates uplink resources to the high-priority WCDs based on the unadjusted power headroom reports (as indicated by block 312) and allocates uplink resources to the basic-priority WCDs based on the adjusted power headroom reports (as indicated by block 314).

The adjusted power headrooms reported by the basic-priority WCDs could be downwardly-adjusted power headrooms. As a result, the wireless network may de-allocate one or more resource blocks that had been allocated to basic-priority WCDs and instead allocate them to high-priority WCDs. In this way, under certain conditions (such as when the uplink resources in the wireless coverage area have become fully utilized or nearly fully utilized) the wireless network can make additional uplink resources available to high-priority WCDs and/or can make additional uplink resources available for WCDs to transmit high-priority data.

With regard to the priority levels described herein, including priority levels for WCDs and priority levels for data, it is to be understood that any number of priority levels could be defined. Each such priority level could be associated with a respective adjustment value. Thus, in some examples, two priority levels of WCDs could be defined: basic-priority WCDs and high-priority WCDs. In other examples, a greater number of priority levels of WCDs could be defines. As well, data could be classified as either high-priority data or low-priority data. Alternatively, a greater number of priority levels of data could be defined.

4. Example WCD

Figure 5:
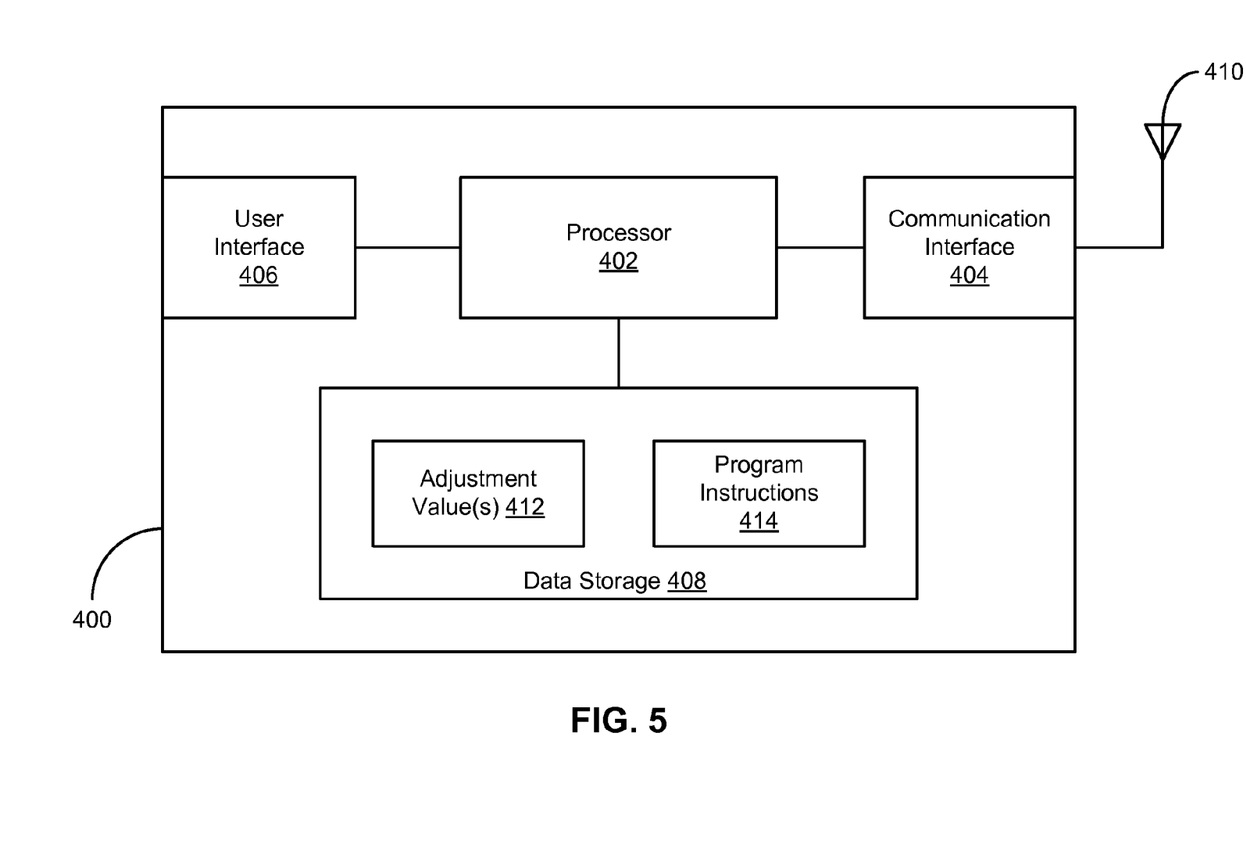
FIG. 5 is a block diagram of a WCD, in accordance with an exemplary embodiment.

FIG. 5 illustrates an example WCD 400 that can perform at least some of the functions described herein, such as method 200 shown in FIG. 3. In this example, WCD 400 includes a processor 402 that is coupled to a communication interface 404, to a user interface 406, and to data storage 408.

Communication interface 404 may include a transmitter for wirelessly transmitting uplink data to a wireless network and a receiver for wirelessly receiving downlink data transmitted by the wireless network. In some cases, the transmitter and receiver could be integrated together as a transceiver. Communication interface 404 may transmit and receive wireless signals via one or more antennas, exemplified in FIG. 5 by antenna 410.

User interface 406 is configured to receive input from the user and to convey output from the user. For instance, user interface 406 may include a touch screen, a keypad, buttons, and or other controls for receiving input from the user. User interface 406 may also include a display screen for displaying textual and/or graphical information to the user. In addition, user interface 406 may include a microphone and speaker for voice communication.

Data storage 408 may include any type of non-transitory computer readable medium, such as random access memory (RAM), read-only memory (ROM), flash memory, cache memory, one or more magnetically encoded disks, one or more optically encoded disks, and/or any other type of volatile or non-volatile memory. Data storage 408 may store various kinds of data, such as one or more adjustment values 412.

Data storage 408 may store program instructions 414 that are executable by processor 402 to control the functioning of WCD 400. For example, program instructions 414 may be executable by processor 402 to cause WCD 400 to perform functions including: (a) determining a transmit power requirement for a first uplink resource allocation available to transmit first data to the wireless network; (b) determining a power headroom based on a difference between a maximum transmit power and the transmit power requirement; (c) determining an adjustment value; (d) adjusting the power headroom based on the adjustment value to obtain an adjusted power headroom; (e) transmitting, via the transmitter, a report of the adjusted power headroom to the wireless network; (f) receiving, via the receiver, a second uplink resource allocation from the wireless network in response to the report of the adjusted power headroom; and (g) using the second uplink resource allocation to transmit, via the transmitter, second data to the wireless network. These functions could, for example, be performed as described above for FIG. 2.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method, comprising:
a wireless communication device (WCD) using a first uplink resource allocation to transmit first data to a wireless network;
said WCD determining a transmit power requirement for said first uplink resource allocation;
said WCD determining a power headroom based on a difference between a maximum transmit power and said transmit power requirement;
said WCD determining an adjustment value;
said WCD adjusting said power headroom based on said adjustment value to obtain an adjusted power headroom;
said WCD transmitting a report of said adjusted power headroom to said wireless network;
said WCD receiving from said wireless network a second uplink resource allocation in response to said report of said adjusted power headroom; and
said WCD using said second uplink resource allocation to transmit second data to said wireless network.

2. The method of claim 1, wherein each of said first uplink resource allocation and said second resource allocation includes at least one resource block.

3. The method of claim 2, wherein each resource block in said first and second uplink resource allocations includes a predetermined number of subcarriers and has a predetermined time duration.

4. The method of claim 2, wherein said first and second uplink resource allocations include different numbers of resource blocks.

5. The method of claim 1, wherein said WCD is configured to communicate with said wireless network in accordance with a Long Term Evolution (LTE) protocol.

6. The method of claim 1, wherein said WCD determining an adjustment value comprises said WCD determining said adjustment value based on an instruction from said wireless network.

7. The method of claim 1, wherein said WCD determining an adjustment value comprises said WCD determining said adjustment value based on a priority level of said WCD.

8. The method of claim 1, wherein said WCD determining an adjustment value comprises said WCD determining said adjustment value based on a priority level of said second data.

9. The method of claim 1, wherein said adjusted power headroom is greater than said power headroom.

10. The method of claim 1, wherein said adjusted power headroom is less than said power headroom.

11. A wireless communication device (WCD), comprising:
a transmitter for wirelessly transmitting data to a wireless network;
a receiver for wirelessly receiving data from said wireless network;
a processor;
data storage;
instructions stored in said data storage and executable by said processor to cause said WCD to perform functions comprising:
(a) determining a transmit power requirement for a first uplink resource allocation available to transmit first data to said wireless network;
(b) determining a power headroom based on a difference between a maximum transmit power and said transmit power requirement;
(c) determining an adjustment value;
(d) adjusting said power headroom based on said adjustment value to obtain an adjusted power headroom;
(e) transmitting, via said transmitter, a report of said adjusted power headroom to said wireless network;
(f) receiving, via said receiver, a second uplink resource allocation from said wireless network in response to said report of said adjusted power headroom; and
(g) using said second uplink resource allocation to transmit, via said transmitter, second data to said wireless network.

12. The method of claim 11, wherein each of said first uplink resource allocation and said second resource allocation includes at least one resource block.

13. The method of claim 12, wherein each resource block in said first and second uplink resource allocations includes a predetermined number of subcarriers and has a predetermined time duration.

14. The method of claim 12, wherein said first and second uplink resource allocations include different numbers of resource blocks.

15. The method of claim 11, wherein determining an adjustment value comprises determining said adjustment value based on an instruction from said wireless network.

16. The method of claim 11, wherein determining an adjustment value comprises determining said adjustment value based on a priority level of said WCD.

17. The method of claim 11, wherein determining an adjustment value comprises determining said adjustment value based on a priority level of said second data.

18. A method comprising:
a wireless network serving a plurality of wireless communication devices (WCDs) in a wireless coverage area, said plurality of WCDs including one or more basic-priority WCDs and one or more high-priority WCDs;
said wireless network detecting a trigger condition for said wireless coverage area; and
in response to said trigger condition, said wireless network instructing said basic-priority WCDs to report adjusted power headrooms.

19. The method of claim 18, wherein said wireless network detecting a trigger condition for said wireless coverage area comprises said wireless network determining that a usage level of said wireless coverage area has reached a threshold level.

20. The method of claim 18, wherein said wireless network detecting a trigger condition for said wireless coverage area comprises said wireless network determining that a number of high-priority WCDs being said served by said wireless coverage area has reached a threshold number.

* * * * *